US012142762B2

(12) United States Patent
Kanai et al.

(10) Patent No.: US 12,142,762 B2
(45) Date of Patent: Nov. 12, 2024

(54) POSITIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING POSITIVE ELECTRODE ACTIVE MATERIAL FOR NON-AQUEOUS ELECTROLYTE SECONDARY BATTERY

(71) Applicant: Panasonic Intellectual Property Management Co., Ltd., Osaka (JP)

(72) Inventors: Toshinobu Kanai, Hyogo (JP); Takeshi Ogasawara, Osaka (JP); Tetsuo Kadohata, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 504 days.

(21) Appl. No.: 17/620,941

(22) PCT Filed: Jun. 16, 2020

(86) PCT No.: PCT/JP2020/023540
§ 371 (c)(1),
(2) Date: Dec. 20, 2021

(87) PCT Pub. No.: WO2020/262100
PCT Pub. Date: Dec. 30, 2020

(65) Prior Publication Data
US 2022/0367868 A1    Nov. 17, 2022

(30) Foreign Application Priority Data

Jun. 28, 2019  (JP) .................................. 2019-121844

(51) Int. Cl.
| | |
|---|---|
| H01M 4/525 | (2010.01) |
| C01G 53/00 | (2006.01) |
| H01M 4/02 | (2006.01) |
| H01M 4/505 | (2010.01) |
| H01M 10/0525 | (2010.01) |

(52) U.S. Cl.
CPC ............ H01M 4/525 (2013.01); C01G 53/50 (2013.01); H01M 4/505 (2013.01);
(Continued)

(58) Field of Classification Search
CPC ................. H01M 4/505; H01M 4/525; H01M 2004/028; C01G 53/50
See application file for complete search history.

(56) References Cited

U.S. PATENT DOCUMENTS

| | | |
|---|---|---|
| 2011/0195309 A1 | 8/2011 | Nina et al. |
| 2016/0293952 A1 | 10/2016 | Kaneda et al. |
| 2020/0388841 A1* | 12/2020 | Kaneda ................. H01M 4/525 |

FOREIGN PATENT DOCUMENTS

| | | | |
|---|---|---|---|
| JP | 2009-140787 | * | 6/2009 |
| JP | 2009-140787 A | | 6/2009 |

(Continued)

OTHER PUBLICATIONS

English translation of JP Publication 2009-140787, Jun. 2009.*
(Continued)

Primary Examiner — Brittany L Raymond
(74) Attorney, Agent, or Firm — WHDA, LLP (57) ABSTRACT

A positive electrode active material to be used in a non-aqueous electrolyte secondary battery and containing a lithium transition metal compound which contains Ni in a proportion constituting 80-94 mol %, inclusive, relative to the total mole number of the metal elements other than Li, and also contains Nb in a proportion constituting 0.1-0.6 mol %, inclusive, relative thereto, the positive electrode active material being characterized in that the Nb amount n1 in a
(Continued)

first sample solution obtained by adding 0.2 g of the lithium transition metal compound to a hydrochloric acid aqueous solution comprising 5 mL of pure water/5 mL of 35% hydrochloric acid, and the Nb amount n2 in a second sample solution obtained by immersing a filter used to filter the first sample solution in a fluonitric acid comprising 5 mL of 46% hydrofluoric acid/5 mL of 63% nitric acid satisfy the condition of $50\% \leq n1/(n1+n2) < 75\%$ when converted to molar quantities.

5 Claims, 1 Drawing Sheet

(52) U.S. Cl.
CPC ..... *H01M 10/0525* (2013.01); *C01P 2002/80* (2013.01); *C01P 2006/40* (2013.01); *H01M 2004/028* (2013.01); *H01M 2300/0017* (2013.01)

(56) References Cited

FOREIGN PATENT DOCUMENTS

| | | |
|---|---|---|
| JP | 2011-187435 A | 9/2011 |
| JP | 2015-122298 A | 7/2015 |
| WO | 2015/076323 A1 | 5/2015 |
| WO | 2018/123951 A1 | 7/2018 |

OTHER PUBLICATIONS

International Search Report dated Sep. 24, 2020, issued in counterpart International Application No. PCT/JP2020/023540 (2 pages).
The Extended European Search Report dated Jul. 21, 2022, issued in counterpart to EP Application No. 20832549.8. (9 pages).

* cited by examiner

POSITIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING POSITIVE ELECTRODE ACTIVE MATERIAL FOR NON-AQUEOUS ELECTROLYTE SECONDARY BATTERY

TECHNICAL FIELD

The present disclosure relates to a positive electrode active material for a non-aqueous electrolyte secondary battery, to a non-aqueous electrolyte secondary battery, and to a method of producing a positive electrode active material for a non-aqueous electrolyte secondary battery.

BACKGROUND ART

In recent years, as secondary batteries having a high power and a high energy density, non-aqueous electrolyte secondary batteries are widely in use, which comprise a positive electrode, a negative electrode, and a non-aqueous electrolyte, and in which lithium ions or the like are moved between the positive electrode and the negative electrode to charge/discharge the batteries. From viewpoints of reduced resistance, increased capacity, increased reliability, or the like, of the battery, there is a demand for improvements of characteristics of a positive electrode active material contained in the positive electrode of the battery.

For example, Patent Literature 1 discloses a positive electrode active material for a non-aqueous electrolyte secondary battery having a high capacity, an improved cycle characteristic, and an improved thermal stability by having a lithium nickel manganese composite oxide containing Nb in an amount of 2 mol %~8 mol %, having a lithium niobium compound on surfaces of primary particles, and in which a part of Nb solid-dissolves in the primary particles.

CITATION LIST

Patent Literature

PATENT LITERATURE 1: International Publication No. WO 2018/123951

SUMMARY

In a lithium transition metal compound included in the positive electrode active material, a design may be considered in which a content of Ni is increased in order to realize a high battery capacity and a content of Co is reduced in order to reduce the manufacturing cost. However, in a lithium transition metal compound in which a ratio of Ni with respect to a total number of moles of metal elements other than Li is greater than or equal to 80 mol %, and a ratio of Co is less than or equal to 10 mol %, a reaction resistance of the battery may be increased. The technique of Patent Literature 1 does not take into consideration the reaction resistance of the battery, and there remains a room of improvement.

An advantage of the present disclosure lies in provision of a positive electrode active material including a lithium transition metal compound in which a ratio of Ni with respect to a total number of moles of metal elements other than Li is greater than or equal to 80 mol %, a ratio of Co is less than or equal to 10 mol %, and the reaction resistance of the battery is reduced.

According to one aspect of the present disclosure, there is provided a positive electrode active material for a non-electrolyte secondary battery, comprising a lithium transition metal compound which contains Ni in a ratio of greater than or equal to 80 mol % and less than or equal to 94 mol % with respect to a total number of moles of metal elements other than Li, and which contains Nb in a ratio of greater than or equal to 0.1 mol % and less than or equal to 0.6 mol % with respect to the total number of moles of the metal elements other than Li, wherein a condition of 50%≤n1/(n1+n2)<75% is satisfied in a molar amount equivalence, wherein n1 is an amount of Nb, quantitated through inductively coupled plasma atomic emission spectroscopy, in a first filtered solution obtained by dissolving a first sample solution, in which 0.2 g of a lithium transition metal compound is added to an aqueous solution of hydrochloric acid having 5 mL of pure water/5 mL of 35% hydrochloric acid, for 120 minutes under bumping, and filtering the first sample solution, and n2 is an amount of Nb, quantitated through inductively coupled plasma atomic emission spectroscopy, in a second filtered solution obtained by dissolving a second sample solution, in which a filter used for the filtration of the first sample solution is immersed in a fluonitric acid having 5 mL of 46% hydrofluoric acid/5 mL of 63% nitric acid, for 180 minutes under bumping, and filtering the second sample solution.

According to another aspect of the present disclosure, there is provided a non-aqueous electrolyte secondary battery comprising a positive electrode including the above-described positive electrode active material, a negative electrode, and a non-aqueous electrolyte.

According to another aspect of the present disclosure, there is provided a method of producing a positive electrode active material for a non-aqueous electrolyte secondary battery, the method comprising: mixing a composite oxide containing at least Ni, a Li compound, and a Nb compound, to obtain a mixture; and baking the mixture under an oxygen atmosphere in a baking furnace by increasing a temperature of the baking furnace with a temperature increasing rate at a temperature of greater than or equal to 450° C., and lower than or equal to 680° C. being in a range of greater than 3.5° C./minute and less than or equal to 5.5° C./minute, and a maximum reaching temperature being in a range of greater than or equal to 700° C., and lower than or equal to 780° C., wherein a retention time of the maximum reaching temperature is longer than or equal to 1 hour and shorter than or equal to 10 hours.

According to the positive electrode active material for the non-aqueous electrolyte secondary battery according to an aspect of the present disclosure, a non-aqueous electrolyte secondary battery having a low reaction resistance can be provided.

DESCRIPTION OF EMBODIMENTS

A layer-form structure of a lithium transition metal compound includes a transition metal layer such as Ni, a Li layer, and an oxygen layer, and, by Li ions existing in the Li layer reversibly entering and exiting these layers, charging and discharging reactions of the battery take place. In the lithium transition metal compound contained in the positive electrode active material, when a ratio of Ni with respect to a total number of moles of metal elements other than Li is greater than or equal to 80 mol % and a ratio of Co is less than or equal to 10 mol %, formation of a NiO layer or decomposition of an electrolyte solution on surfaces of primary particles and secondary particles of the lithium transition metal compound may be accelerated, resulting in an increased reaction resistance of the battery.

The present inventors have studied and reviewed, and found that the reaction resistance of the battery can be reduced by restricting a content of Nb to a value less than or equal to 0.6 mol %, and adjusting a distribution state of Nb. It can be deduced that, with the presence of a predetermined amount of a Nb compound on the surfaces of the primary particles and secondary particles of the lithium ion transition metal compound, an interface resistance can be reduced, and the reaction resistance of the battery can be reduced.

A non-aqueous electrolyte secondary battery according to an embodiment of the present disclosure will now be described in detail. In the following, a circular cylindrical battery will be exemplified in which a rolled type electrode assembly is housed in a battery case of a circular cylindrical shape, but the electrode assembly is not limited to the rolled type, and may alternatively be, for example, a layered type in which a plurality of positive electrodes and a plurality of negative electrodes are layered, layer by layer, with a separator therebetween. The battery case is not limited to the circular cylindrical shape, and may alternatively have, for example, a polygonal shape, a coin shape, or the like. Alternatively, the battery case may be formed from laminated sheets including a metal layer and a resin layer.

Figure 1:
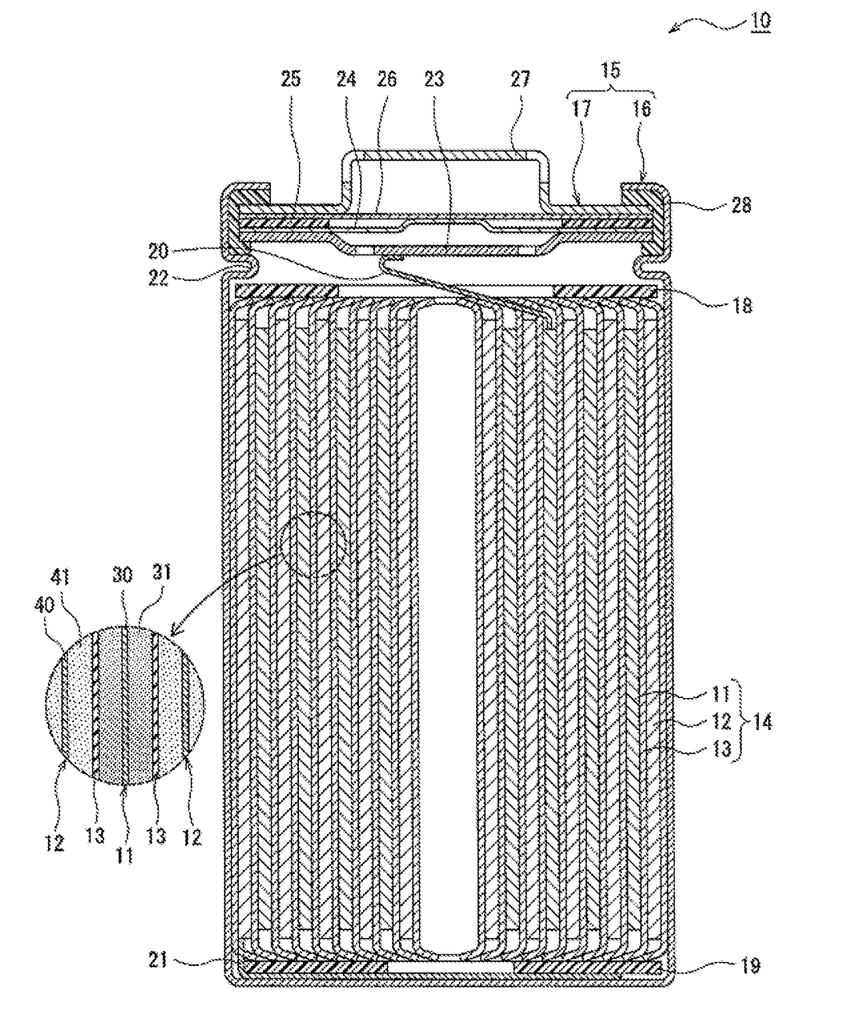
FIG. 1 is a cross-sectional diagram of a non-aqueous electrolyte secondary battery according to an embodiment of the present disclosure.

FIG. 1 is a cross-sectional diagram of a non-aqueous electrolyte secondary battery 10 according to an embodiment of the present disclosure. As exemplified in FIG. 1, the non-aqueous electrolyte secondary battery 10 comprises an electrode assembly 14, a non-aqueous electrolyte (not shown), and a battery case 15 which houses the electrode assembly 14 and the non-aqueous electrolyte. The electrode assembly 14 has a rolled shape in which a positive electrode 11 and a negative electrode 12 are rolled with a separator 13 therebetween. The battery case 15 is formed from an outer can 16 having a circular cylindrical shape with a bottom, and a sealing assembly 17 which closes an opening of the outer can 16.

The electrode assembly 14 is formed from the positive electrode 11 having an elongated shape, the negative electrode 12 having an elongated shape, two separators 13 having an elongated shape, a positive electrode tab 20 joined to the positive electrode 11, and a negative electrode tab 21 joined to the negative electrode 12. The negative electrode 12 is formed in a size slightly larger than the positive electrode 11 in order to prevent precipitation of lithium. Specifically, the negative electrode 12 is formed to be longer in a longitudinal direction and in a width direction (short side direction) than the positive electrode 11. The two separators 13 are formed in a size slightly larger than at least the positive electrode 11, and are placed, for example, to sandwich the positive electrode 11.

The non-aqueous electrolyte secondary battery 10 comprises insulating plates 18 and 19 respectively placed above and below the electrode assembly 14. In the example configuration shown in FIG. 1, the positive electrode tab 20 attached to the positive electrode 11 extends through a throughhole of the insulating plate 18 to the side of the sealing assembly 17, and the negative electrode tab 21 attached to the negative electrode 12 extends through an outer side of the insulating plate 19 to the side of a bottom of the outer can 16. The positive electrode tab 20 is connected to a lower surface of a bottom plate 23 of the sealing assembly 17 by welding or the like, and a cap 27 of the sealing assembly 17 electrically connected to the bottom plate 23 serves as a positive electrode terminal. The negative electrode tab 21 is connected to an inner surface of the bottom of the outer can 16 by welding or the like, and the outer can 16 serves as a negative electrode terminal.

The outer can 16 is, for example, a metal container having a circular cylindrical shape with a bottom. A gasket 28 is provided between the outer can 16 and the sealing assembly 17, and an internal space of the battery case 15 is tightly sealed. The outer can 16 has a groove portion 22 which is formed, for example, by pressing a side surface portion from the outside, and which supports the sealing assembly 17. The groove portion 22 is desirably formed in an annular shape along a circumferential direction of the outer can 16, and supports the sealing assembly 17 with an upper surface thereof.

The sealing assembly 17 has a structure in which a bottom plate 23, a lower vent member 24, an insulating member 25, an upper vent member 26, and the cap 27 are layered in this order from the side of the electrode assembly 14. The members of the sealing assembly 17 have, for example, a circular disk shape or a ring shape, and members other than the insulating member 25 are electrically connected to each other. The lower vent member 24 and the upper vent member 26 are connected to each other at respective center portions, and the insulating member 25 interposes between peripheral portions of the valve elements 24 and 26. When an internal pressure of the battery increases due to abnormal heat generation, the lower vent member 24 deforms to press the upper vent member 26 upwards to the side of the cap 27 and ruptures, so that a current path between the lower vent member 24 and the upper vent member 26 is disconnected. When the internal pressure further increases, the upper vent member 26 ruptures, and gas is discharged from an opening of the cap 27.

The positive electrode 11, the negative electrode 12, the separator 13, and the non-aqueous electrolyte of the non-aqueous electrolyte secondary battery 10 will now be described. In particular, a positive electrode active material contained in a positive electrode active material layer 31 of the positive electrode 11 will be described in detail.

[Positive Electrode]

The positive electrode 11 comprises a positive electrode current collector 30 and a positive electrode active material layer 31 formed over both surfaces of the positive electrode current collector 30. For the positive electrode current collector 30, there may be employed a foil of a metal which is stable within a potential range of the positive electrode 11 such as aluminum or an aluminum alloy, a film on a surface layer of which the metal is placed, or the like. The positive electrode active material layer 31 includes a positive electrode active material, an electrically conductive material, and a binder material. A thickness of the positive electrode active material layer 31 is, for example, greater than or equal to 10 μm and less than or equal to 150 μm on one side of the positive electrode current collector 30. The positive electrode 11 can be produced by applying a positive electrode slurry including the positive electrode active material, the electrically conductive material, the binder material, or the like over a surface of the positive electrode current collector 30, drying the applied film, and compressing the dried film to form the positive electrode active material layer 31 over both surfaces of the positive electrode current collector 30.

As the electrically conductive material included in the positive electrode active material layer 31, there may be exemplified carbon materials such as carbon black, acetylene black, Ketjen black, graphite, or the like. As the binder material included in the positive electrode active material layer 31, there may be exemplified a fluororesin such as polytetrafluoroethylene (PTFE), polyvinylidene fluoride (PVdF), or the like, polyacrylonitrile (PAN), polyimide, an acrylic resin, polyolefin, or the like. Alternatively, these resins may be employed along with carboxy methyl cellulose (CMC) or a salt thereof, polyethylene oxide (PEO), or the like.

The positive electrode active material includes a lithium transition metal compound containing Ni in an amount of greater than or equal to 80 mol % and less than or equal to 94 mol % with respect to a total number of moles of metal elements other than Li, and containing Nb in an amount of greater than or equal to 0.1 mol % and less than or equal to 0.6 mol % with respect to the total number of moles of the metal elements other than Li. The lithium transition metal compound has a layer-foam structure, which includes a transition metal layer such as Ni, a Li layer, and an oxygen layer. As the layer-form structure of the lithium transition metal compound, for example, there may be exemplified a layer-form structure belonging to a space group R-3m, a layer-form structure belonging to a space group C2/m, or the like. Of these, desirably, the layer-form structure belonging to the space group R-3m is employed, from the viewpoints of higher capacity, stability of the crystal structure, and the like.

The lithium transition metal compound may be represented by a general formula, $Li_aNi_xCo_yM_zNb_\alpha O_2$ (wherein $0.95 \leq a \leq 1.10$, $0.80 \leq x \leq 0.94$, $0 \leq y \leq 0.02$, $0.04 \leq z \leq 0.20$, $0.001 \leq \alpha \leq 0.006$, $x+y+z+\alpha=1$, and M includes at least one element selected from Al, W, Mg, Ti, Mn, and Mo).

The parameter a indicating a ratio of Li with respect to the total number of moles of the metal elements other than Li in the lithium transition metal compound satisfies a condition of $0.95 \leq a \leq 1.10$, desirably satisfies a condition of $0.95 \leq a \leq 1.05$, and particularly desirably satisfies a condition of $0.97 \leq a \leq 1.03$. When the parameter a is less than 0.95, the battery capacity may be reduced in comparison to the case when the above-described range for the parameter a is satisfied. When the parameter a is greater than or equal to 1.10, a larger amount of the Li compound would be added in comparison to the case when the above-described range for the parameter a is satisfied, which may not be economical from the viewpoint of the manufacturing cost.

The parameter x indicating a ratio of Ni with respect to the total number of moles of the metal elements other than Li and Nb in the lithium transition metal compound satisfies the condition of $0.80 \leq x \leq 0.94$, in order to realize a high capacity of the battery and to add other metal elements.

The parameter y indicating a ratio of Co with respect to the total number of moles of the metal elements other than Li in the lithium transition metal compound satisfies a condition of $0 \leq y \leq 0.02$. Co is an optional composition. In addition, because Co is expensive, the condition of $y \leq 0.02$ is satisfied from the viewpoint of reduction of the manufacturing cost.

The parameter z indicting a ratio of M (wherein M includes at least one element selected from Al, Mn, Ti, Mo, W, and Mg) with respect to the total number of moles of the metal elements other than Li in the lithium transition metal compound satisfies a condition of $0.04 \leq z \leq 0.20$. M may be Al and Mn.

The parameter a indicating a ratio of Nb with respect to the total number of moles of the metal elements other than Li in the lithium transition metal compound satisfies a condition of $0.001 \leq \alpha \leq 0.006$, and desirably satisfies a condition of $0.001 \leq \alpha \leq 0.003$. Nb is a necessary composition. When $\alpha$ is less than 0.001 ($\alpha<0.001$), the advantage of reducing the reaction resistance of the battery cannot be obtained. On the other hand, when a is greater than 0.006 ($\alpha>0.006$), an initial capacity of the battery is low.

Depending on the distribution state of Nb contained in the lithium transition metal compound, the reaction resistance of the battery can be reduced. More specifically, the reaction resistance of the battery can be reduced by having the Nb compound existing on surfaces of primary particles and secondary particles of the lithium transition metal compound such that an index $n1/(n1+n2)$ calculated in the following manner satisfies a condition of $50\% \leq n1/(n1+n2)<75\%$:

(1) a first sample solution in which 0.2 g of a lithium transition metal compound is added to an aqueous solution of hydrochloric acid having 5 mL of pure water/5 mL of 35% hydrochloric acid is dissolved for 120 minutes under bumping, and the first sample solution is filtered;

(2) an amount of Nb n1 in a first filtered solution obtained by filtering the first sample solution is quantitated by inductively coupled plasma atomic emission spectroscopy;

(3) a second sample solution in which a filter used for the filtration of the first sample solution is immersed in a fluonitric acid having 5 mL of 46% hydrofluoric acid/5 mL of 63% nitric acid is dissolved for 180 minutes under bumping, and the second sample solution is filtered;

(4) an amount of Nb n2 in a second filtered solution obtained by filtering the second sample solution is quantitated by inductively coupled plasma atomic emission spectroscopy, and (5) from n1 and n2 quantitated in the above-described manner, the value of $n1/(n1+n2)$ is calculated in a molar amount equivalence.

The parameter n1 may be considered as indicating an amount of Nb contained in particular in the Li layer in a crystal lattice of the lithium transition metal compound. The parameter n2 may be considered as indicating an amount of Nb existing on the surfaces of the primary particles and the surfaces of the secondary particles of the lithium transition metal compound. Thus, the value of $n1/(n1+n2)$ is an index indicating an approximate ratio of Nb contained in the crystal lattice of the lithium transition metal compound. It can be deduced that, when the Nb compound is present on the surfaces of the primary particles and the surfaces of the secondary particles of the lithium transition metal compound in an amount satisfying the condition of $50\% \leq n1/(n1+n2)<75\%$, the increase of the reaction resistance of the battery can be suppressed.

Contents of the elements of the lithium transition metal compound may be measured using, for example, an inductively coupled plasma atomic emission spectroscopy device (ICP-AES), an electron probe microanalyzer (EPMA), an energy-dispersive X-ray analyzer (EDX), or the like. For example, the content of Nb may be quantitated by dissolving a sample solution, in which 0.2 g of the lithium transition metal compound is added to fluonitric acid having 5 mL of 46% hydrofluoric acid/5 mL of 63% nitric acid, for 180 minutes under bumping, filtering the sample solution, and performing the inductively coupled plasma atomic emission spectroscopy on the resulting filtered solution.

The content of the lithium transition metal compound in the positive electrode active material is desirably greater than or equal to 90 mass % with respect to a total mass of the positive electrode active material, and is more desirably greater than or equal to 99 mass %, from the viewpoint of, for example, improvement of the capacity of the battery or effective suppression of the reduction of a charge/discharge cycle characteristic.

Further, the positive electrode active material of the present embodiment may include, in addition to the lithium transition metal compound of the present embodiment, other lithium transition metal compounds. As the other lithium transition metal compound, there may be exemplified, for example, a lithium transition metal compound in which a content of Ni is greater than or equal to 0 mol % and less than 80 mol %.

Next, an example method of producing the lithium transition metal compound will be described.

A method of producing the lithium transition metal compound includes: mixing a composite oxide containing at least Ni, a Li compound, and a Nb compound to obtain a mixture; and baking the mixture under an oxygen atmosphere in a baking furnace by increasing a temperature of the baking furnace with a temperature increasing rate at a temperature of greater than or equal to 450° C., and lower than or equal to 680° C. being in a range of greater than 3.5° C./minute and less than or equal to 5.5° C./minute, and a maximum reaching temperature being in a range of greater than or equal to 700° C., and lower than or equal to 780° C., wherein a retention time of the maximum reaching temperature is longer than or equal to 1 hour and shorter than or equal to 10 hours.

It is sufficient that the composite oxide containing at least Ni is a composite oxide having a ratio of Ni in the composite oxide of greater than or equal to 80 mol % and less than or equal to 94 mol %, but desirably, a composite oxide is employed which is represented by a general formula of $Ni_xCo_yM_zO_2$ (wherein $0.80 \leq x \leq 0.94$, $0 \leq y \leq 0.02$, $0.04 \leq z \leq 0.20$, $x+y+z=1$, and M includes at least one element selected from Al, W, Mg, Ti, Mn, and Mo). No particular limitation is imposed on the method of producing the composite oxide. For example, the composite oxide containing Ni and other metal elements may be obtained by dropping an alkali solution such as sodium hydroxide into a solution of a metal salt including Ni and other metal elements (such as Co, Al, Mn, or the like) while stirring the solution, to adjust the pH to the alkali side (for example, 8.5~12.5), and to precipitate (coprecipitate) a composite hydroxide containing Ni and other metal elements, and baking the composite hydroxide. No particular limitation is imposed on the baking temperature, and the baking temperature may be, for example, in a range of 500° C.~600° C.

A mixture ratio of the above-described composite oxide, the Li compound, and the Nb compound in the mixing step may be suitably determined such that desired ratios of the elements in the finally obtained Li transition metal oxide can be achieved. A molar ratio of Li with respect to the metal elements other than Li and Nb is greater than or equal to 0.95 mol % and less than or equal to 1.10 mol %, is desirably greater than or equal to 0.95 mol % and less than or equal to 1.05 mol %, and is particular desirably greater than or equal to 0.97 and less than or equal to 1.03. A molar ratio of Nb with respect to the metal elements other than Li and Nb is greater than or equal to 0.001 mol % and less than or equal to 0.006 mol %, and is desirably greater than or equal to 0.0025 mol % and less than or equal to 0.005 mol %. As the Li compound, for example, there may be exemplified $Li_2CO_3$, LiOH, $Li_2O_3$, $Li_2O$, $LiNO_3$, $LiNO_2$, $Li_2SO_4$, $LiOH \cdot H_2O$, LiH, LiF, and the like. As the Nb compound, there may be exemplified $Nb_2O_5$, $Nb_2O_5 \cdot nH_2O$, $LiNbO_3$, $NbCl_5$, and the like. Of these, $Nb_2O_5$ is particularly desirable. In the mixing step, when the composite oxide, the Li compound, and the Nb compound are mixed, other metal materials may be added as necessary. The other metal materials are, for example, metal elements forming a part of the composite oxide, oxides including metal elements other than Li and Nb, and the like.

In the baking step, the mixture obtained in the mixing step is baked under the oxygen atmosphere to obtain the lithium transition metal compound of the present embodiment. In the baking step, the temperature increasing rate at the temperature of greater than or equal to 450° C., and lower than or equal to 680° C. is in a range of greater than 3.5° C./minute and less than or equal to 5.5° C./minute, and the maximum reaching temperature is in a range of greater than or equal to 700° C., and lower than or equal to 780° C. The temperature increasing rate from a temperature of greater than 680° C. to the maximum reaching temperature is, for example, 0.5~2° C./minute. A retention time of the maximum reaching temperature is longer than or equal to 1 hour and shorter than or equal to 10 hours. The baking step is performed, for example, in a baking furnace, and a maximum pressure applied inside the baking furnace during the baking process is desirably in a range of greater than 0.55 kPa and less than or equal to 1.0 kPa in addition to a pressure outside of the baking furnace. Further, the baking step is, for example, a two-stage baking, in order to facilitate adjustment of the distribution state of Nb. A baking temperature of a first stage is desirably in a range of, for example greater than or equal to 450° C., and lower than or equal to 680° C. A baking temperature of a second stage is desirably in a range of, for example, greater than or equal to 700° C., and lower than or equal to 780° C. The distribution state of Nb in the finally obtained lithium transition metal compound is adjusted by controlling the temperature increasing rate, the maximum reaching temperature, the maximum pressure in the baking furnace, or the like in the baking step.

[Negative Electrode]

The negative electrode 12 includes a negative electrode current collector 40 and a negative electrode active material layer 41 formed over both surfaces of the negative electrode current collector 40. For the negative electrode current collector 40, there may be employed a foil of a metal which is stable within a potential range of the negative electrode 12 such as copper, a copper alloy, or the like, a film on a surface layer of which the metal is placed, or the like. The negative electrode active material layer 41 includes a negative electrode active material and a binder material. A thickness of the negative electrode active material layer 41 is, for example, greater than or equal to 10 μm and less than or equal to 150 μm on one side of the negative electrode current collector 40. The negative electrode 12 may be produced by applying a negative electrode slimy including the negative electrode active material, the binder material, or the like over a surface of the negative electrode current collector 40, drying the applied film, and rolling the dried film, to form the negative electrode active material layer 41 over both surfaces of the negative electrode current collector 40.

As the negative electrode active material included in the negative electrode active material layer 41, no particular limitation is imposed so long as the material can reversibly occlude and release lithium ions, and in general, a carbon material such as graphite is used. The graphite may be natural graphite such as flake graphite, vein graphite, amorphous graphite, or the like, or artificial graphite such as artificial bulk graphite, graphitized mesa-phase carbon microbeads, or the like. Alternatively, as the negative electrode active material, a metal which forms an alloy with Li such as Si, Sn, or the like, a metal compound including Si, Sn, or the like, a lithium-titanium composite oxide or the like may be employed. Alternatively, these materials coated with carbon may be employed. For example, a Si-containing compound represented by $SiO_x$ (wherein $0.5 \leq x \leq 1.6$), or a Si-containing compound in which microparticles of Si is dispersed in a lithium silicate phase represented by $Li_{2y}Si_{(2+y)}$ (wherein $0<y<2$) may be used in combination with the graphite.

Similar to the positive electrode 11, for the binder material included in the negative electrode active material layer 41, a fluorine-containing resin such as PTFE, PVdF, or the like, PAN, polyimide, an acrylic resin, polyolefin, or the like may be employed. Desirably, styrene-butadiene rubber (SBR) is employed. Further, the negative electrode active material layer 41 may include CMC or a salt thereof, polyacrylic acid (PAA) or a salt thereof, polyvinyl alcohol (PVA), or the like.

[Separator]

For the separator 13, for example, a porous sheet having an ion permeability and an insulating property may be employed. Specific examples of the porous sheet include a microporous thin film, a woven fabric, a non-woven fabric, or the like. As a material of the separator, desirably, polyethylene, a polyolefin such as polypropylene, cellulose, or the like, is employed. The separator 13 may have a single layer structure or a layered structure. On the surface of the separator 13, there may be provided a resin layer having a high thermal endurance such as an aramid resin, and a filler layer including a filler formed from an inorganic compound.

[Non-Aqueous Electrolyte]

The non-aqueous electrolyte includes, for example, a non-aqueous solvent and an electrolyte salt dissolved in the non-aqueous solvent. For the non-aqueous solvent, for example, esters, ethers, nitriles such as acetonitrile, amides such as dimethylformamide, or a mixture solvent of two or more of these solvents may be employed. The non-aqueous solvent may include a halogen substitution product in which at least a part of hydrogens of the solvent described above is substituted with a halogen atom such as fluorine. As the halogen substitution product, there may be exemplified fluorinated cyclic ester carbonates such as fluoroethylene carbonate (FEC), fluorinated chain ester carbonates, or fluorinated chain ester carboxylates such as fluoromethyl propionate (FMP).

Examples of the esters include cyclic ester carbonates such as ethylene carbonate (EC), propylene carbonate (PC), and butylene carbonate, chain ester carbonates such as dimethyl carbonate (DMC), ethylmethyl carbonate (EMC), diethyl carbonate (DEC), methylpropyl carbonate, ethylpropyl carbonate, and methylisopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), and ethyl propionate (EP).

Examples of the ethers include cyclic ethers such as 1,3-dioxolane, 4-methyl-1,3-dioxolane, tetrahydrofuran, 2-methyl tetrahydrofuran, propylene oxide, 1,2-butylene oxide, 1,3-dioxane, 1,4-dioxane, 1,3,5-trioxane, furan, 2-methyl furan, 1,8-cineol, and crown ether, and chain ethers such as 1,2-dimethoxy ethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxy benzene, 1,2-diethoxy ethane, 1,2-dibutoxy ethane, diethylene glycol dimethyl ether, diethylene glycol diethyl ether, diethylene glycol dibutyl ether 1,1-dimethoxy methane, 1,1-diethoxy ethane, triethylene glycol dimethyl ether, and tetraethylene glycol dimethyl ether.

The electrolyte salt is desirably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (wherein $1<x<6$, n is 1 or 2), $LiB_{10}Cl_{10}$, LiCl, LiBr, LiI, lithium chloroborane, lithium lower aliphatic carboxylate, borate salts such as $Li_2B_4O_7$ and $Li(B(C_2O_4)F_2)$, and imide salts such as $LiN(SO_2CF_3)_2$, and $LiN(C_mF_{2m+1}SO_2)$ (wherein each of l and m is an integer greater than or equal to 0). As the lithium salt, these materials may be used as a single material or a mixture of a plurality of these materials may be used. Of these, $LiPF_6$ is desirably used, from the viewpoints of ion conductivity, electrochemical stability, or the like. A concentration of the lithium salt is desirably set to 0.8~1.8 mol per 1 L of the non-aqueous solvent. Further, vinylene carbonate or a propane sultone-based additive may be added.

EXAMPLES

The present disclosure will now be described further with reference to Examples and Comparative Examples. The present disclosure, however, is not limited to the Examples described below.

[Production of Positive Electrode Active Material]

Example 1-1

A composite hydroxide obtained by coprecipitation and represented by a formula, $[Ni_{0.90}Co_{0.01}Al_{0.05}Mn_{0.04}](OH)_2$, was baked for 2 hours at a temperature of 500° C., and a composite oxide, $(Ni_{0.90}Co_{0.01}Al_{0.05}Mn_{0.04}O_2)$, was obtained. LiOH, the above-described composite oxide, and $Nb_2O_5$ were mixed with a molar ratio between Li and a total amount of Ni, Co, Al, Mn, and Nb being 1.01:1, and a mixture was obtained. A molar ratio of Nb with respect to a total mole of metals other than Li was set to 0.0025. The mixture was baked in an oxygen gas stream for 5 hours by increasing the temperature to a temperature of 680° C. with a temperature increasing rate of 3.8° C./minute in a temperature region of greater than or equal to 450° C. and lower than or equal to 680° C., and then setting the temperature increasing rate to 1° C./minute to a maximum temperature of 720° C. Impurities were removed by water washing, and a lithium transition metal compound was obtained. Using an inductively coupled plasma atomic emission spectroscopy device (product name "SPS3100" manufactured by Seiko Instruments Inc.), the composition of the obtained lithium transition metal compound was measured, and the composition was $LiNi_{0.90}Co_{0.01}Al_{0.05}Mn_{0.04}Nb_{0.0025}O_2$. This compound was set as a positive electrode active material of Example 1-1.

Example 1-2

A lithium transition metal compound was obtained in a manner similar to Example 1-1 except that the temperature increasing rate in the temperature range of greater than or equal to 450° C., and lower than or equal to 680° C. was changed to 5.5° C./minute. The compound was set as a positive electrode active material of Example 1-2.

Example 1-3

A lithium transition metal compound was obtained in a manner similar to Example 1-1 except that the mixture was obtained by mixing $Nb_2O_5$ with the molar ratio of Nb with respect to the total molar ratio of metals other than Li being set to 0.00125. The composition of the obtained lithium transition metal compound was $LiNi_{0.90}Co_{0.01}Al_{0.05}M_{0.04}Nb_{0.00125}O_2$. The compound was set as a positive electrode active material of Example 1-3.

Comparative Example 1-1

A lithium transition metal compound was obtained in a manner similar to Example 1-1 except that the temperature increasing rate in the temperature range of greater than or equal to 450° C., and lower than or equal to 680° C. was changed to 3.2° C./minute. The composition of the obtained lithium transition metal compound was $LiNi_{0.90}Co_{0.01}Al_{0.05}Mn_{0.04}Nb_{0.0025}O_2$. The compound was set as a positive electrode active material of Comparative Example 1-1.

Comparative Example 1-2

A lithium transition metal compound was obtained in a manner similar to Example 1-1 except that the temperature increasing rate in the temperature range of greater than or equal to 450° C., and lower than or equal to 680° C. was changed to 1.2° C./minute. The compound was set as a positive electrode active material of Comparative Example 1-2.

Comparative Example 1-3

A lithium transition metal compound was obtained in a manner similar to Example 1-1 except that the mixture was obtained by mixing $Nb_2O_5$ with the molar ratio of Nb with respect to a total molar ratio of the metals other than Li being set to 0.00125 and that the temperature increasing rate in the temperature range of greater than or equal to 450° C., and lower than or equal to 680° C. was changed to 1.2° C./minute. The composition of the obtained lithium transition metal compound was $LiNi_{0.90}Co_{0.01}Al_{0.05}Mn_{0.04}Nb_{0.00125}O_2$. The compound was set as a positive electrode active material of Comparative Example 1-3.

Comparative Example 1-4

A lithium transition metal compound was obtained in a manner similar to Example 1-1 except that the mixture was obtained without mixing $Nb_2O_5$. The composition of the obtained lithium transition metal compound was $LiNi_{0.90}Co_{0.01}Al_{0.05}Mn_{0.04}O_2$. The compound was set as a positive electrode active material of Comparative Example 1-4.

Comparative Example 1-5

A lithium transition metal compound was obtained in a manner similar to Example 1-1 except that the mixture was obtained by mixing $Nb_2O_5$ with a molar ratio of Nb with respect to the total molar ratio of the metals other than Li being set to 0.00025. The composition of the obtained lithium transition metal compound was $LiNi_{0.90}Co_{0.01}Al_{0.05}Mn_{0.04}Nb_{0.00025}O_2$. The compound was set as a positive electrode active material of Comparative Example 1-5.

Comparative Example 1-6

A lithium transition metal compound was obtained in a manner similar to Example 1-1 except that the mixture was obtained by mixing $Nb_2O_5$ with the molar ratio of Nb with respect to the total molar ratio of the metals other than Li being set to 0.0100. The composition of the obtained lithium transition metal compound was $LiNi_{0.90}Co_{0.01}Al_{0.05}Mn_{0.04}Nb_{0.0098}O_2$. The compound was set as a positive electrode active material of Comparative Example 1-6.

Comparative Example 1-7

A lithium transition metal compound was obtained in a manner similar to Example 1 except that the temperature increasing rate in the temperature range of greater than or equal to 450° C., and lower than or equal to 680° C. was changed to 6.0° C./minute. The compound was set as a positive electrode active material of Comparative Example 7.

Example 2

A composite hydroxide obtained by coprecipitation and represented by a formula, $[Ni_{0.85}Al_{0.05}Mn_{0.10}](OH)_2$, was baked for 2 hours at a temperature of 500° C., and a composite oxide, $(Ni_{0.85}Al_{0.05}Mn_{0.10}O_2)$, was obtained. LiOH, the above-described composite oxide, and $Nb_2O_5$ were mixed with a molar ratio between Li and Ni, Al, Mn, and Nb being 1.01:1, and a mixture was obtained. A molar ratio of Nb with respect to a total mole of metals other than Li was set to 0.0025. The mixture was baked for 5 hours in an oxygen gas stream by increasing the temperature at a temperature increasing rate of 3.8° C./minute in a temperature range of greater than or equal to 450° C., and lower than or equal to 680° C., to a temperature of 680° C., and then setting the temperature increasing rate to 1° C./minute, with a maximum temperature of 750° C. Impurities were removed by water washing, and a lithium transition metal compound was obtained. Using an inductively coupled plasma atomic emission spectroscopy device (product name "SPS3100" manufactured by Seiko Instruments, Inc.), the composition of the obtained lithium transition metal compound was measured, and the composition was $LiNi_{0.85}Al_{0.05}Mn_{0.10}Nb_{0.0025}O_2$. This compound was set as a positive electrode active material of Example 2.

Comparative Example 2

A lithium transition metal compound was obtained in a manner similar to Example 2 except that the temperature increasing rate in the temperature range of greater than or equal to 450° C., and lower than or equal to 680° C. was changed to 1.2° C./minute. The composition of the obtained lithium transition metal compound was $LiNi_{0.85}Al_{0.05}Mn_{0.10}Nb_{0.0025}O_2$. The compound was set as a positive electrode active material of Comparative Example 2.

Example 3

A composite hydroxide obtained by coprecipitation and represented by a formula, la, $[Ni_{0.93}Al_{0.04}Mn_{0.03}](OH)_2$, was baked for 2 hours at a temperature of 500° C., and a composite oxide, $(Ni_{0.93}Al_{0.04}Mn_{0.03}O_2)$, was obtained. LiOH, the above-described composite oxide, and $Nb_2O_3$ were mixed with a molar ratio between Li and a total amount of Ni, Al, run, and Nb being set to 1.01:1, and a mixture was obtained. The molar ratio of Nb with respect to the total mole of metals other than Li was set to 0.0025. The mixture was baked for 5 hours in an oxygen gas stream by increasing the temperature with a temperature increasing rate of 3.8° C./minute in a temperature range of greater than or equal to 450° C., and lower than or equal to 680° C., to a temperature of 680° C., and then changing the temperature increasing rate to PC/minute, with a maximum temperature of 710° C. Impurities were removed by water washing, and a lithium transition metal compound was obtained. Using an inductively coupled plasma atomic emission spectroscopy device (product name "SPS3100" manufactured by Seiko Instruments, Inc.), the composition of the obtained lithium transition metal compound was measured, and the composition was $LiNi_{0.93}Al_{0.04}Mn_{0.03}Nb_{0.0025}O_2$. This compound was set as a positive electrode active material of Example 3.

Comparative Example 3

A lithium transition metal compound was obtained in a manner similar to Example 3 except that the temperature increasing rate in the temperature range of greater than or equal to 450° C., and lower than or equal to 680° C. was changed to 1.2° C./minute. The composition of the obtained lithium transition metal compound was $LiNi_{0.93}Al_{0.04}Mn_{0.03}Nb_{0.0025}O_2$. The compound was set as a positive electrode active material of Comparative Example 3.

A value of an index $n1/(n1+n2)$ indicating a distribution state of Nb was calculated under the conditions described above for the lithium transition metal compounds (positive electrode active materials) of Examples and Comparative Examples. TABLE 1 shows values of n1, n2, and $n1/(n1+n2)*100(\%)$.

Using the lithium transition metal compounds (positive electrode active materials) of Examples and Comparative Examples, test cells were produced in the following manner.

[Production of Positive Electrode]

91 parts by mass of the positive electrode active material of Example 1, 7 parts by mass of acetylene black serving as an electrically conductive material, and 2 parts by mass of polyvinylidene fluoride serving as a binder agent were mixed, and the resulting mixture was mixed with N-methyl-2-pyrrolidone (NMP) to prepare a positive electrode slurry. Then, the slurry was applied over both surfaces of a positive electrode current collector made of an aluminum foil having a thickness of 15 μm, the applied film was dried, and the dried film was rolled with a rolling roller, to produce a positive electrode in which positive electrode active material layers were formed over both surfaces of the positive electrode current collector. A filling density of the positive electrode active material layer was 3.55 g/cm³. Positive electrodes were similarly produced for other Examples and Comparative Examples.

[Production of Negative Electrode]

As a negative electrode active material, 96 parts by mass of graphite and 4 parts by mass of SiOx (x=94) having a carbon coating were used. 100 parts by mass of the negative electrode active material, 1 part by mass of a dispersion of SBR and 1 part by mass of sodium salt of CMC were mixed, and the mixture was then mixed with water to prepare a negative electrode slurry. The slurry was applied over both surfaces of a negative electrode current collector made of a copper foil, the applied film was dried, and the dried film was rolled by a rolling roller, to produce a negative electrode in which negative electrode active material layers were formed over both surfaces of the negative electrode current collector.

[Preparation of Non-Aqueous Electrolyte]

Ethylene carbonate (EC), methylethyl carbonate (MEC), and dimethyl carbonate (DMC) were mixed with a volume

TABLE 1

| | Content of Lithium transition metal compound (mol %) | | | | | | Baking condition | | Nb distribution state | | |
|---|---|---|---|---|---|---|---|---|---|---|---|
| | | | | | | | Temperature increasing rate (° C./minute) | Maximum temperature (° C.) | | | n1/ (n1 + n2) |
| | Li | Ni | Co | Al | Mn | Nb | | | n1 | n2 | |
| Example 1-1 | 1 | 90 | 1 | 5 | 4 | 0.25 | 3.8 | 720 | 0.17 | 0.075 | 69% |
| Example 1-2 | 1 | 90 | 1 | 5 | 4 | 0.25 | 5.5 | 720 | 0.125 | 0.12 | 51% |
| Example 1-3 | 1 | 90 | 1 | 5 | 4 | 0.125 | 3.8 | 720 | 0.07 | 0.055 | 56% |
| Comparative Example 1-1 | 1 | 90 | 1 | 5 | 4 | 0.25 | 3.2 | 720 | 0.20 | 0.045 | 82% |
| Comparative Example 1-2 | 1 | 90 | 1 | 5 | 4 | 0.25 | 1.2 | 720 | 0.24 | 0.01 | 96% |
| Comparative Example 1-3 | 1 | 90 | 1 | 5 | 4 | 0.125 | 1.2 | 720 | 0.12 | 0.01 | 92% |
| Comparative Example 1-4 | 1 | 90 | 1 | 5 | 4 | 0 | 3.8 | 720 | — | — | — |
| Comparative Example 1-5 | 1 | 90 | 1 | 5 | 4 | 0.025 | 3.8 | 720 | 0.02 | 0.005 | 80% |
| Comparative Example 1-6 | 1 | 90 | 1 | 5 | 4 | 0.98 | 3.8 | 720 | 0.85 | 0.13 | 87% |
| Comparative Example 1-7 | 1 | 90 | 1 | 5 | 4 | 0.25 | 6.0 | 720 | 0.175 | 0.065 | 73% |
| Example 2 | 1 | 85 | 0 | 5 | 10 | 0.25 | 3.8 | 750 | 0.15 | 0.10 | 60% |
| Comparative Example 2 | 1 | 85 | 0 | 5 | 10 | 0.25 | 1.2 | 750 | 0.20 | 0.05 | 80% |
| Example 3 | 1 | 93 | 0 | 4 | 3 | 0.25 | 3.8 | 710 | 0.135 | 0.12 | 53% |
| Comparative Example 3 | 1 | 93 | 0 | 4 | 3 | 0.25 | 1.2 | 710 | 0.20 | 0.045 | 82% | ratio of 3:3:4. To the mixture solvent, lithium hexafluorophosphate (LiPF$_6$) was dissolved in a concentration of 1.2 mol/liter, to prepare a non-aqueous electrolyte.

[Production of Test Cell]

The positive electrode of Example 1, and the negative electrode were layered in a manner to oppose each other and with a separator therebetween, and the layered structure was rolled, to produce an electrode assembly. Then, the electrode assembly and the non-aqueous electrolyte described above were inserted into an outer housing element made of aluminum, to produce a test cell. Test cells were similarly produced for other Examples and Comparative Examples.

[Measurement of Initial Battery Capacity]

For each test cell, under a temperature condition of 25° C., the test cell was charged with a constant current of 120 mA until a cell voltage reached 4.2 V, and then, was charged with a constant voltage of 4.2 V until a current value reached 8 mA. A charged capacity at this time was set as a battery capacity.

[Measurement of Reaction Resistance]

After the measurement of the battery capacity described above, for each test cell under a temperature condition of 25° C., the test cell was again charged with a constant current of 120 mA until the cell voltage reached 4.2 V, and was then charged with a constant voltage of 4.2 V until the current value reached 8 mA. Then, using an alternate current impedance measurement device, an alternate current impedance for 20 kHz-0.01 Hz was measured for the test cell, a Cole-Cole plot was drawn from the measured data, and a reaction resistance was determined based on a size of an arc between 10 Hz and 0.1 Hz.

TABLES 2 to 4 show battery capacities and reaction resistances of Examples and Comparative Examples. TABLE 2 shows actually measured values of the battery capacities and the reaction resistances of the test cells of Examples 1-1~1-3 and Comparative Examples 1-1~1-7.

TABLE 3 shows the actually measured values of the battery capacities of the test cells of Example 2 and Comparative Example 2. The reaction resistance of the test cell of Example 2 is relatively represented, with the reaction resistance of the test cell of Comparative Example 2 being 100.

TABLE 4 shows the actually measured values of the battery capacities of the test cells of Example 3 and Comparative Example 3 The reaction resistance of the test cell of Example 3 is relatively represented, with the reaction resistance of the test cell of Comparative Example 3 being 100.

TABLE 2

|  | Battery capacity (mAh/g) | Reaction resistance (Ω) |
|---|---|---|
| Example 1-1 | 232 | 40.9 |
| Example 1-2 | 232 | 41.5 |
| Example 1-3 | 232 | 40.7 |
| Comparative Example 1-1 | 231 | 48.3 |
| Comparative Example 1-2 | 233 | 49.7 |
| Comparative Example 1-3 | 232 | 47.6 |
| Comparative Example 1-4 | 233 | 48.0 |
| Comparative Example 1-5 | 232 | 51.8 |
| Comparative Example 1-6 | 220 | 52.4 |
| Comparative Example 1-7 | 218 | 40.5 |

TABLE 3

|  | Battery capacity (mAh/g) | Reaction resistance |
|---|---|---|
| Example 2 | 225 | 91 |
| Comparative Example 2 | 225 | 100 |

TABLE 4

|  | Battery capacity (mAh/g) | Reaction resistance |
|---|---|---|
| Example 3 | 233 | 91 |
| Comparative Example 3 | 233 | 100 |

In TABLE 2, Examples 1-1~1-3 which satisfy the condition of 50%≤n1/(n1+n2)<75% had lower reaction resistances than those of Comparative Examples 1-1~1-6. It can be deduced that the battery capacity is low in Comparative Example 1-6 because the content of Nb was too high, and the battery capacity is low in Comparative Example 1-7 because the temperature increasing rate was too fast.

In TABLES 3 and 4 also, regardless of the content of Ni, Examples 2 and 3 satisfying the condition of 50%≤n1/(n1+n2)<75% had lower reaction resistances than Comparative Examples 2 and 3, respectively.

REFERENCE SIGNS LIST 10 non-aqueous electrolyte secondary battery; 11 positive electrode; 12 negative electrode; 13 separator; 14 electrode assembly; 15 battery case; 16 outer can; 17 sealing assembly; 18, 19 insulating plate; 20 positive electrode tab; 21 negative electrode tab; 22 groove portion; 23 bottom plate; 24 lower vent member; 25 insulating member; 26 upper vent member; 27 cap; 28 gasket; 30 positive electrode current collector; 31 positive electrode active material layer; 40 negative electrode current collector; 41 negative electrode active material layer.

The invention claimed is:

1. A positive electrode active material for a non-aqueous electrolyte secondary battery, comprising:
a lithium transition metal compound which contains Ni in a ratio of greater than or equal to 80 mol % and less than or equal to 94 mol % with respect to a total number of moles of metal elements other than Li, and which contains Nb in a ratio of greater than or equal to 0.1 mol % and less than or equal to 0.6 mol % with respect to the total number of moles of the metal elements other than Li, wherein
a condition of 50%≤n1/(n1+n2)<75% is satisfied in a molar amount equivalence, wherein n1 is an amount of Nb, quantitated through inductively coupled plasma atomic emission spectroscopy, in a first filtered solution obtained by dissolving a first sample solution, in which 0.2 g of the lithium transition metal compound is added to an aqueous solution of hydrochloric acid having 5 mL of pure water/5 mL of 35% hydrochloric acid, for 120 minutes under bumping, and filtering the first sample solution, and n2 is an amount of Nb, quantitated through inductively coupled plasma atomic emission spectroscopy, in a second filtered solution obtained by dissolving a second sample solution, in which a filter used for the filtration of the first sample solution is immersed in fluonitric acid having 5 mL of 46% hydrofluoric acid/5 mL of 63% nitric acid, for 180 minutes under bumping, and filtering the second sample solution.

2. The positive electrode active material for the non-aqueous electrolyte secondary battery according to claim 1, wherein the lithium transition metal compound is represented by a general formula, $Li_aNi_xCo_yM_zNb_\alpha O_2$ (wherein $0.95 \leq a \leq 1.10$, $0.80 \leq x \leq 0.94$, $0 \leq y \leq 0.02$, $0.04 \leq z \leq 0.20$, $0.001 \leq \alpha \leq 0.006$, $x+y+z+\alpha=1$, and M includes at least one element selected from Al, W, Mg, Ti, Mn, and Mo).

3. A non-aqueous electrolyte secondary battery comprising:
 a positive electrode including the positive electrode active material for the non-aqueous electrolyte secondary battery according to claim 1;
 a negative electrode; and
 a non-aqueous electrolyte.

4. A method of producing a positive electrode active material for a non-aqueous electrolyte secondary battery, the method comprising:
 mixing a composite oxide containing at least Ni, a Li compound, and a Nb compound, to obtain a mixture; and
 baking the mixture under an oxygen atmosphere in a baking furnace by increasing a temperature of the baking furnace with a temperature increasing rate at a temperature of greater than or equal to 450° C. and lower than or equal to 680° C. being in a range of greater than 3.5° C./minute and less than or equal to 5.5° C./minute, and a maximum reaching temperature being in a range of greater than or equal to 700° C. and lower than or equal to 780° C., wherein
 a retention time of the maximum reaching temperature is longer than or equal to 1 hour and shorter than or equal to 10 hours.

5. The method of producing the positive electrode active material for the non-aqueous electrolyte secondary battery according to claim 4, wherein
 in the baking, a maximum pressure applied in the baking furnace is in a range of greater than 0.55 kPa and less than or equal to 1.0 kPa, in addition to a pressure outside the baking furnace.

\* \* \* \* \*